United States Patent
Beyer et al.

(10) Patent No.: US 11,902,392 B1
(45) Date of Patent: Feb. 13, 2024

(54) TENANT-SPECIFIC EXTENSIONS IN DISTRIBUTED APPLICATIONS USING AN APPLICATION MODEL EXTENSION ENGINE

(71) Applicant: SAP SE, Walldorf (DE)

(72) Inventors: Bertram Beyer, Nussloch (DE); Thanh-Phong Lam, Heidelberg (DE); Gabriel Kevorkian, Suresnes (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/209,620

(22) Filed: Jun. 14, 2023

(51) Int. Cl.
*H04L 67/51* (2022.01)
(52) U.S. Cl.
CPC .................................. *H04L 67/51* (2022.05)
(58) Field of Classification Search
CPC ..................................................... H04L 67/51
USPC .......................................................... 709/203
See application file for complete search history.

(56) References Cited

U.S. PATENT DOCUMENTS

| | | | | |
|---|---|---|---|---|
| 10,904,074 | B2 * | 1/2021 | Wilson | G06F 21/50 |
| 11,758,010 | B1 * | 9/2023 | Tamilselvam | G06F 40/20 |
| | | | | 709/203 |
| 2023/0199078 | A1 * | 6/2023 | Gopal | H04L 67/51 |
| | | | | 709/203 |
| 2023/0246954 | A1 * | 8/2023 | Palumbo | H04L 45/24 |
| | | | | 709/238 |

OTHER PUBLICATIONS

Learn.microsoft.com [online], "Design interservice communication for microservices" Oct. 2022, retrieved on Jun. 14, 2023, retrieved from URL <https://learn.microsoft.com/en-us/azure/architecture/microservices/design/interservice-communication#synchronous-versus-asynchronous-messaging>, 10 pages.

Learn.microsoft.com [online], "Event-driven architecture style" Sep. 2022, retrieved on Jun. 14, 2023, retrieved from URL <https://learn.microsoft.com/en-us/azure/architecture/guide/architecture-styles/event-driven>, 3 pages.

(Continued)

*Primary Examiner* — Wing F Chan
*Assistant Examiner* — Leon Y Tseng
(74) *Attorney, Agent, or Firm* — Fish & Richardson P.C.

(57) ABSTRACT

The present disclosure involves systems, software, and computer implemented methods for tenant-specific extensions in distributed applications using an application model extension engine. One example method includes receiving a request from a customer of a distributed multitenant application to add an extension field to a document type used by the application. An activation command is posted to an asynchronous message topic that requests each microservice of the application to activate the extension field to support the extension field for the customer. Replies to the activation command are received from the microservices that indicate whether respective microservices have successfully activated the extension field. In response to determining that each microservice has successfully activated the extension field for the customer, an activation success command is sent to the asynchronous message topic that informs the microservices that the extension field can be used for the customer in the distributed multitenant application.

20 Claims, 12 Drawing Sheets

(56) References Cited

OTHER PUBLICATIONS

Randy Heffner [online], "How to Avoid Building a Microservices Death Star" Webinar featuring Forrestor, Aug. 6, 2020, retrieved on Jun. 14, 2023, <https://www.brighttalk.com/webcast/17917/428437>, 2 pages.

Wikipedia.org [online], "CAP Theorem" created on Mar. 2010, retrieved on Jun. 14, 2023, retrieved from URL <https://en.wikipedia.org/wiki/CAP_theorem>, 3 pages.

Wikipedia.org [online], "Event-driven Messaging" created on Feb. 2010, retrieved on Jun. 14, 2023, retrieved from URL <https://en.wikipedia.org/wiki/Event-driven_messaging>, 2 pages.

Wikipedia.org [online], "Eventual Consistency" created on Apr. 2005, retrieved on Jun. 14, 2023, retrieved from URL <https://en.wikipedia.org/wiki/Eventual_consistency>, 3 pages.

Wikipedia.org [online], "Microservices" created on Aug. 2014, retrieved on Jun. 14, 2023, retrieved from URL <https://en.wikipedia.org/wiki/Microservices>, 11 pages.

Wikipedia.org [online], "Plug-in (Computing)" created on Jul. 2001, retrieved on Jun. 14, 2023, retrieved from URL <https://en.wikipedia.org/wiki/Plug-in_(computing)>, 4 pages.

\* cited by examiner

800

```
00  {
01      "extensionSetID": "43d99d51-0c50-43a9-8a0c-5d82a593ef27",
02      "status": "ACTIVATED"
03      "extensionFields": [
04        {
05          "name": "Procure for Vaccine",
06          "type": "BOOLEAN",
07          "extensionPoint" : "PurchaseRequisitionItem",
08        }
09      ]
10  }
```

```
0  {
1      "Quantity": "DECIMAL",
2      "UnitOfMeasure": "STRING",
3      "Currency": "STRING",
4      ...
5      " ProcureForVaccine ": "BOOLEAN"
6  }
```

0  {
1    "Quantity": "DECIMAL",
2    "UnitOfMeasure": "STRING",
3    "Currency": "STRING",
4    ...
5    "ItemCategory": "STRING",
6    "Properties": [{"Key": "STRING", "Value": "STRING"}]
7  }
```

0  {
1    "Quantity": "10",
2    "UnitOfMeasure": "KG",
3    "Currency": "EUR",
4    ...
5    "ItemCategory": "STANDARD",
6    "Properties": [{"Key": " ProcureForVaccine ", "Value": "TRUE"}]
7  }
```

FIG. 11

< Manage Extension Fields  ˅

Standard* ˅

Search 🔍 | Editing Status: All ˅  1214 | Extension Point: ˅  1216 | Name: 🔽▲  1218 | Status: ˅  1220 | Type: ˅  1222 | Go  Enter | 🏠 ⟲ ? TL 1224 ↗  1212 ↗  Adapt Filters (1)

Extension Fields (9) 1202                                                  Activate   Create   Delete   ⚙  ▢  ˅

| ☒ | Extension Point 1204 | Name 1206 ↑≡ | Status 1208 | Type 1210 ˅ |
|---|---|---|---|---|
| ☐ | Purchase Requisition Header | Field 1 | In Activation | Boolean |
| ☐ | Purchase Requisition Header | Field 2 | In Activation | Boolean |
| ☐ | Purchase Requisition Header | Field 3 | In Activation | Boolean |
| ☐ | Purchase Requisition Header | Field 4 | In Activation | Date |
| ☐ | Purchase Requisition Header | Field 5 | Activated | Boolean |
| ☐ | Purchase Requisition Item | Field 6 | Activated | Boolean |
| ☐ | Purchase Requisition Item | Field 7 | Activated | Boolean |
| ☐ | Purchase Requisition Item | Field 8 | Activated | Boolean |
| ☐ | Purchase Requisition Item | Field 9 | Activated | Boolean |

TENANT-SPECIFIC EXTENSIONS IN DISTRIBUTED APPLICATIONS USING AN APPLICATION MODEL EXTENSION ENGINE

TECHNICAL FIELD

The present disclosure relates to computer-implemented methods, software, and systems for tenant-specific extensions in distributed applications using an application model extension engine.

BACKGROUND

Distributed systems such as microservice architectures can include multiple services where a given service might communicate with one or more other services. The distributed system can use an event-driven message paradigm to reduce coupling between different services. With the event-driven approach, services can use a middleware component to send and receive data to/from other services rather than communicating directly with other services.

SUMMARY

The present disclosure involves systems, software, and computer implemented methods for tenant-specific extensions in distributed applications using an application model extension engine. An example method includes: receiving a request from a first customer of a distributed multitenant application to add an extension field for the first customer to a first document type used by the distributed multitenant application; posting an activation command to a first asynchronous message topic that requests each microservice of multiple different microservices of the distributed multitenant application to activate the extension field at the microservice by enhancing, in a microservice database of the microservice, a database schema for first customer for the first document type to support the extension field for the first customer; receiving replies to the activation command, at a second asynchronous message topic, from the multiple different microservices, wherein each reply indicates whether a respective microservice of the multiple different microservices has successfully activated the extension field at the microservice for the first customer; determining an overall activation status based on the replies to the activation command received at the second asynchronous message topic; determining whether the overall activation status indicates that each microservice of the multiple different microservices has successfully activated the extension field for the first customer; in response to determining that each microservice of the multiple different microservices has successfully activated the extension field for the first customer, sending an activation success command to the first asynchronous message topic that informs the multiple different microservices that the extension field can be used for the first customer in the distributed multitenant application; and receiving, at a third asynchronous message topic and from a first microservice, an application message for the first customer for the first document type that includes a value for the extension field.

Implementations may include one or more of the following features. A second microservice can retrieve the application message and extract information from the application message, where the information includes the value for the extension field. The second microservice can store the value for the extension field in a portion of a microservice database of the second microservice that stores data for the first customer. A third microservice can receive a startup event that indicates that the third microservice is a new microservice. A set of extensions that have not been activated at the third microservice can be identified, where the set of extensions includes the extension field. For each extension in the set of extensions, an activation command can be sent to the third microservice to activate the extension. A status reply to each activation command can be received that indicates whether the third microservice has successfully activated a respective extension. An activation state of the third microservice can be stored that indicates whether the third microservice has successfully activated each extension. Before receiving the request from the first customer to add the extension field, extension points of document types used in the distributed multitenant application can be identified, where each extension point indicates a document portion of a document type that can be extended. The identified extension points can be provided to the first customer in a user interface that enables the first customer to provide information for the extension field and associate the extension field with a first extension point at which to add the extension field. The request received from the first customer can include the first extension point. In response to determining that not all microservices of the multiple different microservices have successfully activated the extension field for the first customer, a determination can be made as to whether to resubmit the activation command to microservices that have not successfully activated the extension field. In response to determining to resubmit the activation command, the activation command can be resubmitted to microservices that have not successfully activated the extension field. In response to determining to not resubmit the activation command, error handling can be performed based on not all microservices having successfully activated the extension field. The error handling can include sending a rollback command instructing microservices that activated the extension field to rollback activation of the extension field. An application message for a second customer for the first document type that does not include a value for the extension field can be received at the third asynchronous message topic and from a first microservice. The application message for the first customer and the application message for the second customer can each include a property bag, where the property bag in the application message for the first customer includes the value for the extension field and the property bag in the application message for the second customer is an empty property bag.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 8 illustrates an example application model extension event model.

FIG. 9 illustrates an example extended database schema for a microservice for a tenant.

FIG. 10 illustrates an example message schema that can support extension field values.

FIG. 11 illustrates an example message instance for a microservice that includes an extension field value.

FIG. 12 illustrates an example extension field list user interface.

FIG. 13 illustrates an example extension field detail user interface.

DETAILED DESCRIPTION

Figure 1:
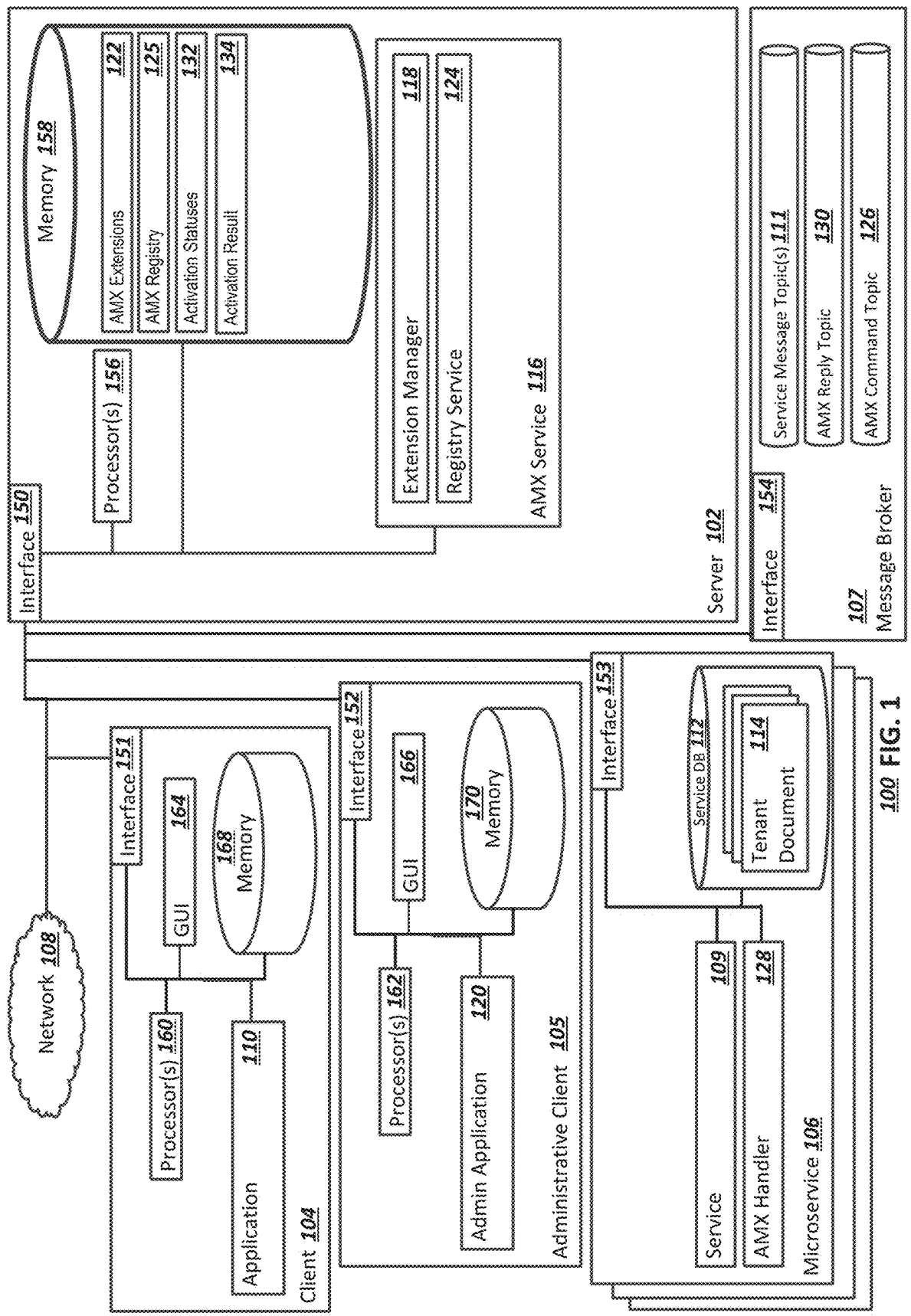
FIG. 1 is a block diagram illustrating an example system for tenant-specific extensions in distributed applications using an application model extension engine.

Applications and processes of a software system can be configured to process certain types of documents. However, a given customer of the software system may have a need to tailor processes to their own needs either for differentiation purposes or to meet a particular requirement. A customer need may involve a need to augment one or more types of documents with information specific to the customer need or scenario. Structural extensibility functionality offered by a software system can enable customers to extend standard representations of documents as defined by an application with custom fields to capture additional information while still being able to benefit from standard processing offered by the application.

As an example, suppose a customer wants to adapt its procurement process so that certain purchase requisition (PR) documents take precedence over others and benefit from special handling. For instance, in the context of a pandemic, for PR documents meant to procure items for the creation of vaccines, a customer might introduce a Boolean-valued "Procure for Vaccine" field that a buyer can set to true or false, depending on the nature of the requisition. Later in customer processes, the value of the procure-for-vaccine field might be seen and taken into account by an approver, a purchaser, or an automated process. The procure-for-vaccine field may be specific just to that particular customer, but the customer may wish to add the custom field for use in procurement applications that are offered by the software system and used by multiple customers.

Challenges can occur when providing structural extensibility in SaaS (Software as a Service) applications, however. A SaaS application can use multiple, distributed microservices, for example, where each microservice may use a different database. The configuration information for the new custom field cannot be updated in a single location such as a central database since each microservice uses a separate database.

Rather, addition of a custom field in a distributed environment can involve having to update multiple, different databases used by multiple different microservices, while also supporting multitenancy. Accordingly, customer field updating can involve distributing custom field enhancement to document structures or schemas across multiple microservices that make up the application. Additionally, if a problem occurs while updating one or more of the microservices after some of the microservices have been updated, or if one or more microservices are not successfully updated for some other reason, consistency and other problems can occur. Therefore, custom field handling as described herein can be performed in the system in a robust, resilient fashion, to avoid such inconsistencies.

Referring again to the procure-for-vaccine example, if a customer wants to extends a PR document for use by that customer to include the procure-for-vaccine field, the solution described herein can apply and orchestrate the extension at multiple services in a distributed system. For example, both a PR service and a PR2PO (PR to purchase order) service can each have their own PR document representations in their own local database schema. Additionally, the events exchanged between different services can each have their own PR document schemas. The solution described herein can ensure, before an extension such as a new procure-for-vaccine field is visible and useable for the customer, that all involved message and database schemas have been successfully updated to create an updated and consistent system.

Furthermore, multitenancy can pose other challenges. Extensions by nature are tenant specific. That is, a customer's extension should be implemented so that the extension is only visible to that customer. Accordingly, microservices, as tenant-aware components, can be updated to extend tenant specific configurations to support customer-specific extensions.

A further challenge can arise in that a messaging infrastructure used for communicating between messages may not support tenant-specific schemas. For example, the messaging infrastructure, as a non-tenant specific component, might not be able to be extended in certain ways but can use a solution that provides extensibility in a generic way which works for all tenant configurations. That is, the solution described herein can be configured to map data between tenant-aware and not-tenant aware components.

The solution described herein can be provided by an Application Model Extension (AMX) service that solves a problem of document extensibility in cloud-native, distributed applications where a same document may be seen/processed by different components. The AMX service can provide support for tenant-specific custom fields for use across different microservices such as a requisition service and a PR2PO service. The AMX service can receive information defining a new custom field (e.g., for PR item data) and provide the new custom field information to each of the microservices operating in the system (e.g., using a tenant-agnostic messaging architecture), so that each respective microservice can update a tenant-specific database schema used by the respective microservice. Accordingly, the AMX service can provide a robust solution for tenant-specific field extensions in distributed applications, solving problems that generally don't exist in supporting extensions for a monolithic system, for example. Further advantages are discussed below.

FIG. 1 is a block diagram illustrating an example system 100 for tenant-specific extensions in distributed applications using an application model extension engine. Specifically, the illustrated system 100 includes or is communicably coupled with a server 102, an end-user client device 104, an administrative client device 105, microservices 106, a message broker 107, and a network 108. Although shown separately, in some implementations, functionality of two or more systems or servers may be provided by a single system or server. In some implementations, the functionality of one illustrated system, server, or component may be provided by multiple systems, servers, or components, respectively.

The microservices 106 can implement, for example, a distributed application. Each microservice 106 can provide service code 109 which can provide specific service-based functionality for the distributed application. An end-user can use an application 110 (which can be a web browser) to access different entry points of the distributed application which can be provided by different microservices 106. The distributed application can serve different customers (e.g., the end-user client device 104 may be of an end user of a particular customer of the distributed application). Microservices 106 can communicate with each other using service message topic(s) 111 provided by the message broker 107. The message broker 107 can provide asynchronous communication services, as described in more detail below.

Each microservice 106 can include or manage a microservice database 112. Each microservice database 112 can store customer-specific (e.g., tenant-specific) data for the microservice 106. For example, a tenant document 114 can be stored that is an instance of a document type of a format defined by a document schema for the customer. Storing customer-specific data in a multi-tenant fashion in the microservice database 112 in a format matching a customer and document type specific schema can enable customer-specific extensions (e.g., extension fields). However, each microservice database 112 of different microservices 106 may need to be updated for the customer to support the extension field.

An AMX service 116 can provide support for tenant-specific field extensions across different microservices 106 in distributed applications. For example, the AMX service 116 can include an extension manager 118 that can provide an administrative application 120 to a customer administrator (for presentation on the administrative client device 105) that enables the customer administrator to provide information for a new extension field. The extension manager 118 can store receive extension field information for the new extension field in AMX extension information 122. As described in more detail below, a registry service 124 can provide information from a registry 125 for display in the administrative application 120 that informs the customer administrator which portions of which document types used in the distributed application can be extended. The registry 124 can also include information such as which microservices 106 process data for which document types.

After receiving information for a new extension field, the AMX service 116 can post a command to an AMX command topic 126 that instructs each microservice 106 to implement the new extension field. Each microservice 106 can implement an AMX handler 128 that can listen for and retrieve an AMX command from the AMX command topic 126. Each AMX handler 128 can retrieve information for the new extension field from the AMX command topic 126 and perform appropriate database schema enhancements in the respective microservice database 112, in a customer-specific fashion. Each AMX handler 128 can also post a status message to an AMX reply topic 130 to inform the AMX service 116 whether the respective microservice 106 was able to adapt the respective microservice database 112 to support the new extension field.

The AMX service 116 can collect activation statuses 132 for the new extension field from different microservices and determine an activation result 134 based on the activation statues 132. The activation result 134 can indicate whether all microservices 106 successfully activated the new extension field, for example. If the activation result 134 indicates successful activation of the extension field across all microservices of the application, the extension field can be used (e.g., written, read) by different microservices 106. Further details of extension field addition, activation, and use based on functionality of the AMX service 116 are described below with respect to FIGS. 2-14.

As used in the present disclosure, the term "computer" is intended to encompass any suitable processing device. For example, although FIG. 1 illustrates a single server 102, a single end-user client device 104, and a single administrative client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 151, 152, 153, and 154 are used by the server 102, the end-user client device 104, the administrative client device 105, the microservice 106, and the message broker 107, respectively, for communicating with other systems in a distributed environment—including within the system 100—connected to the network 108. Generally, the interfaces 150, 151, 152, 153, and 154 each comprise logic encoded in software and/or hardware in a suitable combination and operable to communicate with the network 108. More specifically, the interfaces 150, 151, 152, 153, and 154 may each comprise software supporting one or more communication protocols associated with communications such that the network 108 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the administrative client device 105, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104 and the administrative client device 105 may each generally be any computing device operable to connect to or communicate with the server 102 via the network 108 using a wireline or wireless connection. In general, the end-user client device 104 and the administrative client device 105 each comprise an electronic computer device operable to receive, transmit, process, and store any appropriate data associated with the system 100 of FIG. 1. The end-user client device 104 and the administrative client device 105 can each include one or more client applications, including the application 110 or the administrative application 120, respectively. A client application is any type of application that allows the end-user client device 104 or the administrative client device 105 to request and view content on a respective client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrative client device 105 respectively include processor(s) 160 or processor(s) 162. Each processor 160 or 162 included in the end-user client device 104 or the administrative client device 105 may be a central processing unit (CPU), an application specific integrated circuit (ASIC), a field-programmable gate array (FPGA), or another suitable component. Generally, each processor 160 or 162 included in the end-user client device 104 or the administrative client device 105 executes instructions and manipulates data to perform the operations of the end-user client device 104 or the administrative client device 105, respectively. Specifically, each processor 160 or 162 included in the end-user client device 104 or the administrative client device 105 executes the functionality required to send requests to the server 102 and to receive and process responses from the server 102.

The end-user client device 104 and the administrative client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrative client device 105 may comprise a computer that includes an input device, such as a keypad, touch screen, or other device that can accept user information, and an output device that conveys information associated with the operation of the server 102, or the respective client device itself, including digital data, visual information, or the GUI 164 or a GUI 166, respectively.

The GUIs 164 and 166 interface with at least a portion of the system 100 for any suitable purpose, including generating a visual representation of the application 110 or the administrative application 120, respectively. In particular, the GUI 164 and/or the GUI 166 may be used to view and navigate various Web pages. Generally, the GUI 164 and the GUI 166 provide a respective user with an efficient and user-friendly presentation of business data provided by or communicated within the system. The GUI 164 and the GUI 166 may each comprise a plurality of customizable frames or views having interactive fields, pull-down lists, and buttons operated by the user. The GUI 164 and the GUI 166 each contemplate any suitable graphical user interface, such as a combination of a generic web browser, intelligent engine, and command line interface (CLI) that processes information and efficiently presents the results to the user visually.

Memory 168 and memory 170 included in the end-user client device 104 or the administrative client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168 and the memory 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or administrative client devices 105 associated with, or external to, the system 100. For example, while the illustrated system 100 includes one end-user client device 104, alternative implementations of the system 100 may include multiple end-user client devices 104 communicably coupled to the server 102 and/or the network 108, or any other number suitable to the purposes of the system 100. Additionally, there may also be one or more additional end-user client devices 104 external to the illustrated portion of system 100 that are capable of interacting with the system 100 via the network 108. Further, the term "client", "client device" and "user" may be used interchangeably as appropriate without departing from the scope of this disclosure. Moreover, while the end-user client device 104 and the administrative client device 105 may be described in terms of being used by a single user, this disclosure contemplates that many users may use one computer, or that one user may use multiple computers.

Figure 2:
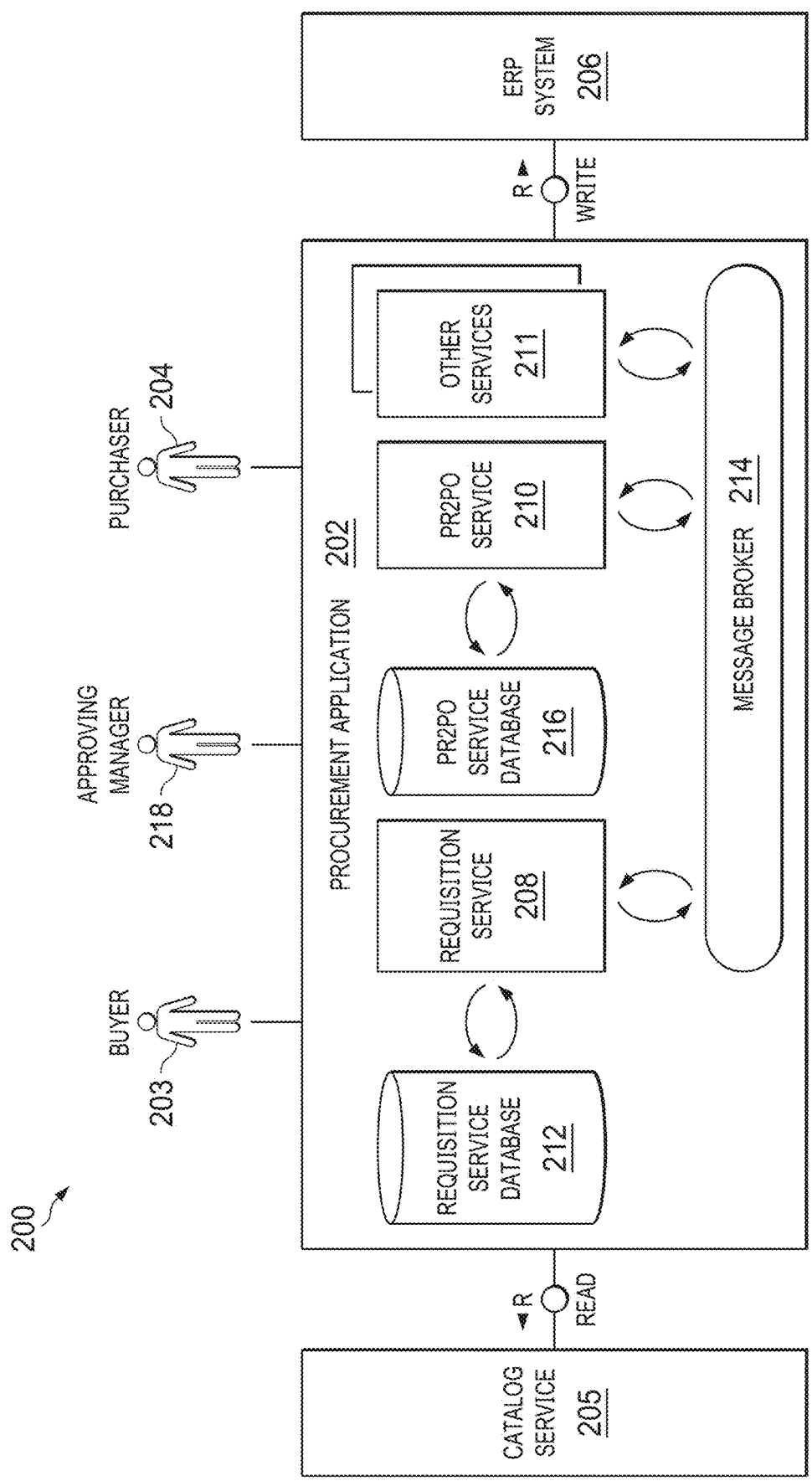
FIGS. 2 and 3 illustrate an example system that includes an example application.

FIG. 2 illustrates an example system that includes an example application. The system 200 includes, for instance, an example procurement application 202. The procurement application 202 is a SaaS (Software as a Service) solution that can be used by a buyer 203, who is an employee of a company, to buy products for the company. The buyer 203 can create a purchase requisition (PR) which can later lead to creation of a purchase order (PO) by a purchaser 204. A PR can describe what is to be bought in what quantity from a catalog offered by a catalog service 205. A PO can represent an order which a supplier receives. PR and PO objects can be represented in an ERP (Enterprise Resource Planning) system 206. The ERP system 206 can support processes such as invoicing, delivery, etc. The procurement application 202 can be used for creation of PR and PO documents.

The ERP system 206 may support, for example, a monolithic ERP application, whereas the procurement application 202 can be a cloud-native solution that can provide services using a set of multiple microservices. Different effort and different challenges can arise when updating either the ERP system 206 or the procurement application 202. Updating the ERP system 206 may involve updating just the monolithic ERP application whereas updating the procurement application 202 may involve updating multiple services.

For example, the procurement application 202 is shown as including a requisition service 208 and a PR2PO (Purchase Requisition to Purchase Order) service 210. Although shown as including two microservices, the procurement application 202 can also include other microservices 211. The requisition service 208 can provide an entry point to the procurement application 202 for the buyer 203 to create a purchase requisition. A created purchase requisition can be stored by the requisition service 208 in a requisition service database 212. A corresponding purchase requisition document and/or object can be created and stored in the ERP system 206.

A purchase requisition can be sent by the requisition service 208 to the PR2PO service 210 using a message broker 214. In some cases, a portion of the purchase requisition, rather than the entire purchase requisition, is sent to the PR2PO service 210. The PR2PO service 210 can store received purchase requisition information in a PR2PO service database 216.

The PR2P0 service 210 can be an entry point to the procurement application 202 for the purchaser 204. The PR2PO service 210 can handle transformation of a purchase requisition into a purchase order. The role of the purchaser 204 can be to manage and monitor a PO creation process with respect to buying policies of the company. Policies can be defined, for example, that specify condition(s) for approving purchase requisitions so that the purchase requisitions can get released for purchase order creation. Approval criteria can include, for example, cost criteria, cost center budget criteria, manager approval (e.g., from an approving manager 218, the buyer's role as an employee, and other criteria. Further details of the procurement application 202 are described below.

Figure 3:
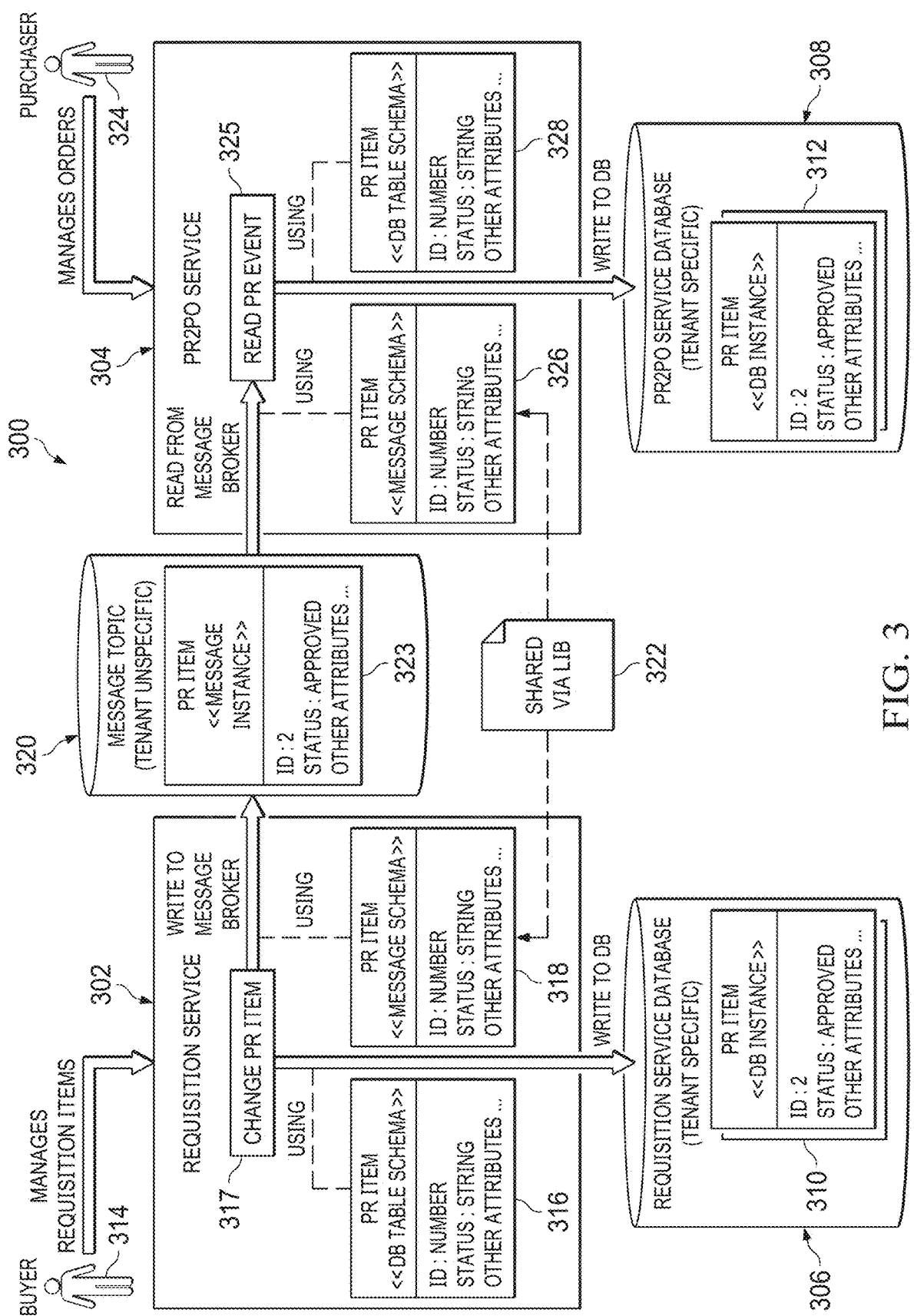

FIG. 3 illustrates an example system 300 that includes an example application. The system 300 illustrates further details for the system 200 and procurement application 202 described above with respect to FIG. 2. For example, the system 300 includes a requisition service 302, a PR2PO service 304, a requisition service database 306, and a PR2PO service database 308 that correspond to the requisition service 208, the PR2PO service 210, the requisition service database 212, and the PR2PO service database 216 of FIG. 2, respectively.

The system 300 supports SaaS applications such as the procurement application 202, where different services (e.g., the requisition service 302 and the PR2PO service 304) each store data in different databases (e.g., the requisition service database 306 and the PR2PO service database 308, respectively). The system 300 uses multiple, different databases rather than one single database shared across services. Different service databases may have different schemas for a same semantic concept. For example, each of the requisition service database 306 and the PR2PO service database 308 store data for PR documents (or portions of PR documents). For instance, each of the requisition service database 306 and the PR2PO service database 308 includes data for PR items (and possibly other PR data, such as PR header information).

Additionally, although the same service code for the requisition service 302 and the PR2PO service 304 can be used for different customers, for data storage, data can be stored independently for each customer in the requisition service database 306 and the PR2PO service database 308 in an isolated fashion for each customer using multitenancy. Each customer can have customer-specific data areas that are each described by a customer-specific schema. The customer-specific schemas can be modified per customer to support customer extension fields, as described in more detail below. The requisition service database 306 includes a PR item instance 310 for a first customer (along with possibly other PR instances, either for the first customer or other customers). Similarly, the PR2PO service database 308 includes a PR item instance 312 (which may be for the first customer or another customer).

The requisition service 302 can enable, for example, a buyer 314 to manage purchase requisition items. For example, the requisition service 302 can enable the buyer 314 to create, edit, and delete purchase requisition items. When a PR item is created or changed, the requisition service 302 can represent PR item data using a PR item database schema 316 and store the new or changed PR item data in the requisition service database 306.

The requisition service 302 can also be configured to send a PR change event in response to every change of a PR document such as PR item data, such as a PR item change 317. The requisition service 302 can create a PR item message based on a message schema 318, for example, and provide the PR item message to a message broker (e.g., the message broker 214 described above with respect to FIG. 2). The message broker 214 can manage a message topic 320, for example, for asynchronous communication between services such as the requisition service 302 and the PR2PO service 304. The message topic 320 can have a data store for storing messages published to the message topic.

The message schema 318 may be included in and/or retrieved from a shared library 322 that is also accessible to the PR2PO service 304. The message topic 320 can be used for tenant-unspecific messages (e.g., the message topic 320 may be used by different tenants). A message instance 323 sent by the requisition service 302 includes a message payload of a format specified by the message schema 318. The message instance 323 can also include a tenant identifier that identifies a tenant for which the message instance 323 is sent.

The PR2PO service 304 can enable a purchaser 324 to manage creation of purchase orders, for example, using PR information. For instance, the PR2PO service 304 can be configured to listen to the message topic 320 to receive published events from the requisition service 302 regarding new or changed PR items. The PR2PO service 304 can receive a copy of the message instance 323, for example, as a read PR event 325. The PR2PO service 304 can read data from the message instance 323 using a message schema 326 (which can be a same schema as the message schema 318 and can be included in and/or obtained from the shared library 322).

The PR2PO service 304 can read a tenant identifier in the message instance 323 to determine a customer database schema 328. The PR2PO service 304 can deserialize the payload of the message instance 323 and use the database schema 328 to store PR data for the customer in a customer-specific area of the PR2PO database 308.

The PR2PO service 304 can be configured to store replicas of relevant PR documents in its PR2PO service database 312, to support PO processing, for example. As described above, the PR2PO service 304 can use PR information that represents approved requisitions to create corresponding PO items. After creating corresponding PO items, PR data used to create the PO items can be removed by the PR2PO service database 308 by the PR2PO service 304.

As described below, the system 300 can be modified to support tenant-specific custom fields for use across different microservices such as the requisition service 302 and the PR2PO service 304. The system 300 can be enhanced so that when a new custom field is created (e.g., for PR item data), new custom field information is received by each of the microservices operating in the system 300 (e.g., using a tenant agnostic messaging architecture), so that each respective microservice can update a tenant-specific database schema used by the respective microservice.

Figure 4:
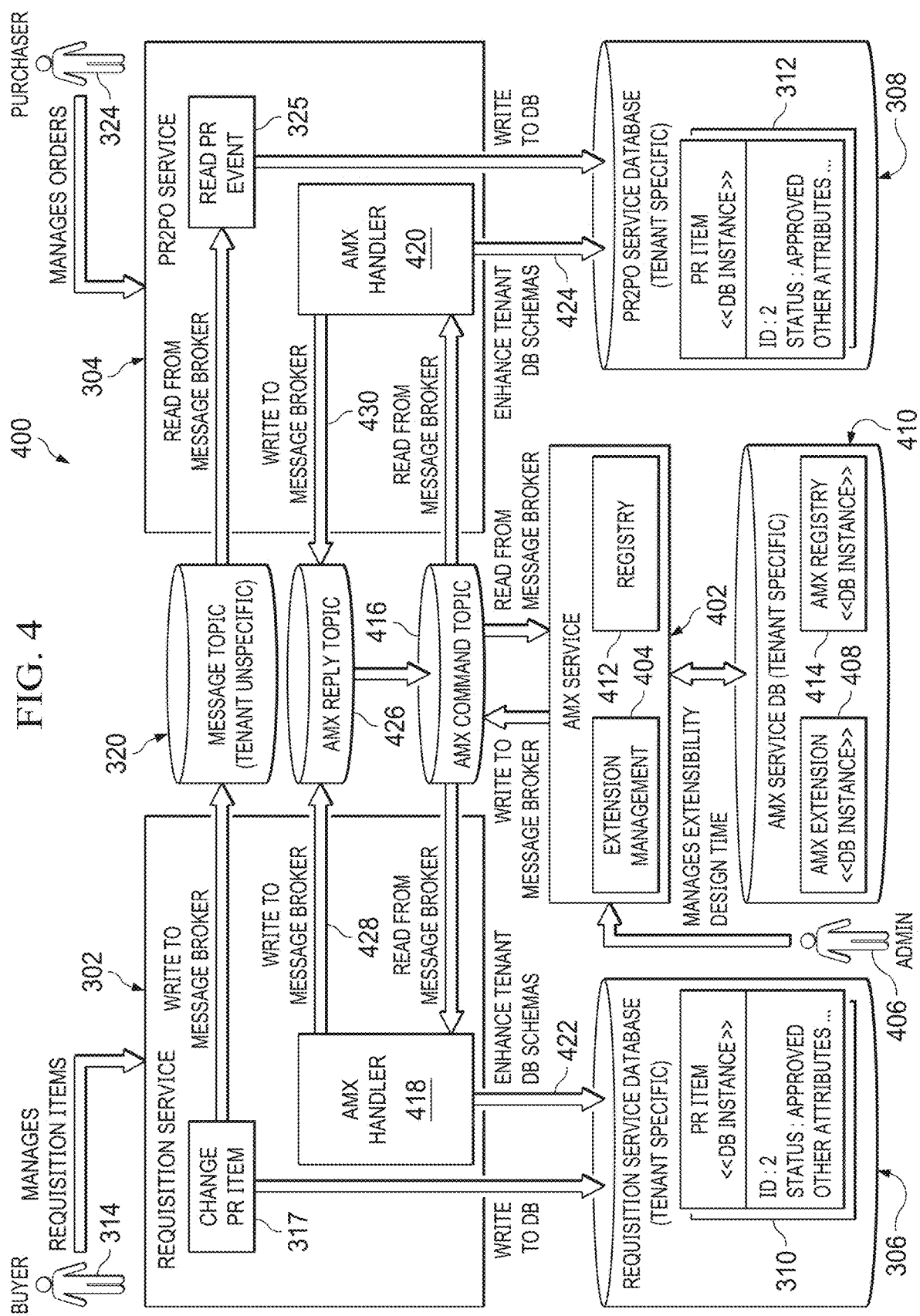
FIG. 4 illustrates an example system for tenant-specific extensions in distributed applications using an application model extension engine.

FIG. 4 illustrates an example system 400 for tenant-specific extensions in distributed applications using an application model extension engine. Portions of the system 400 correspond to similarly named and numbered items as in the system 300 described above with respect to FIG. 3. For example, the requisition service 302 can manage a PR change event 317 by storing new or changed PR item data as PR item data 310 in the purchase requisition service database 306 and by writing a message to the message topic 320 being listened to by the PR2PO service 304. The PR2PO service 304 can receive the PR change event 325 and respond by extracting information from a PR item message of the message topic 320 and storing extracted information in the PR2PO service database 308 of the PR2PO service 304.

The system 400 illustrates an extension of the system 300 by inclusion of an AMX service 402. The AMX service 402 provides extension management features 404 for customer-specific extension field definition and also extension field activation and distribution across different microservices of the system 400. As described in more detail below, the AMX service 402 can integrate with other microservices using an asynchronous request-reply pattern using different AMX message topics.

Figure 13:
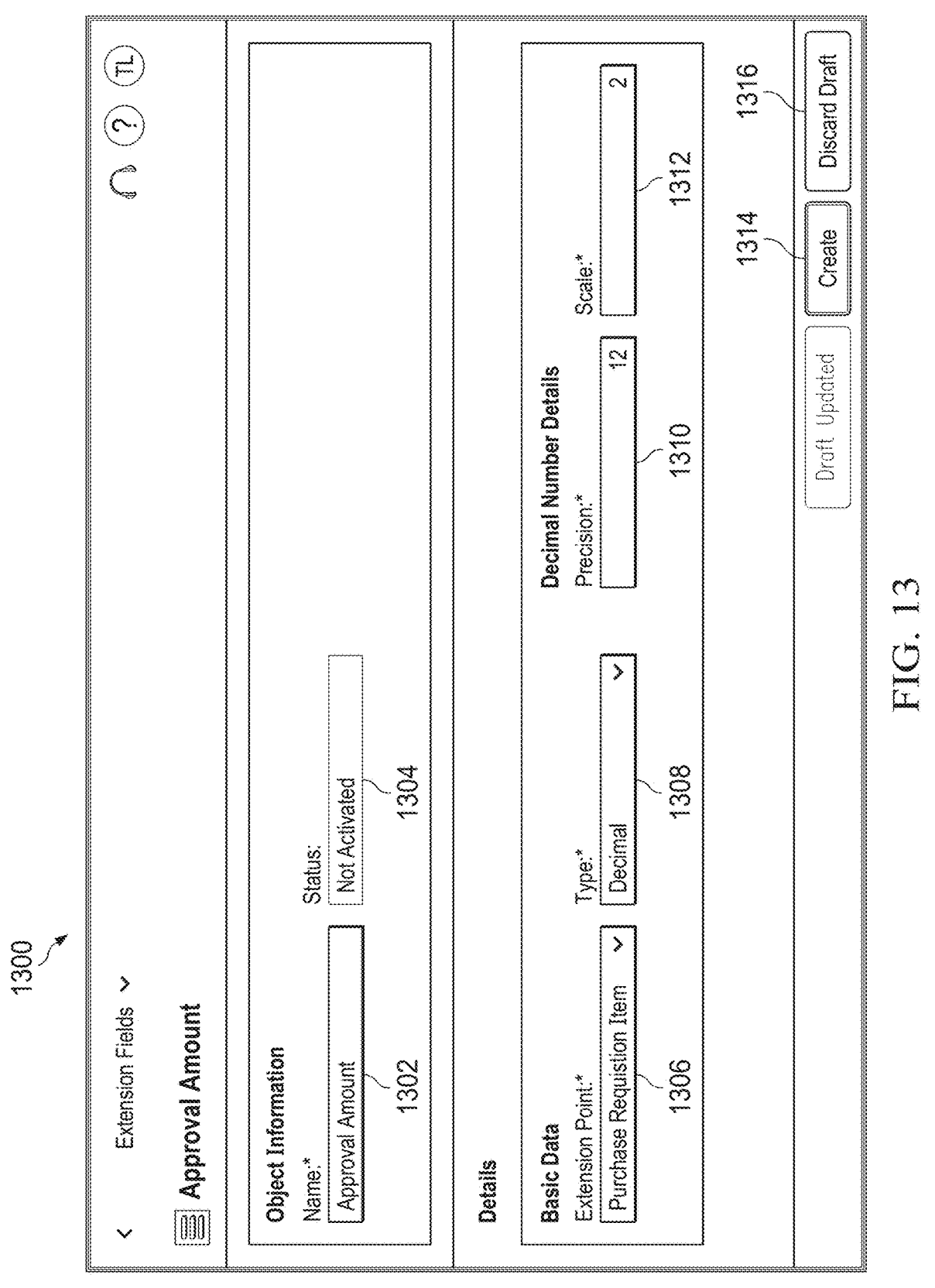

The extension management features 404 can include providing a user interface for a customer administrator 406 to enable the customer administrator 406 to define a custom field for a SaaS application. The customer administrator 406 may be, for example, a domain expert who wants to add a custom field extension to extend the application for application end users. The user interface provided by the AMX service 402 can enable the customer administrator 406 to add a new extension, during design time, without having to write code, for example. An example user interface that can be used for creating a new extension field is shown in FIG. 13. Custom extension field information received from the customer administrator 406 through the user interface can be stored as AMX extension information 408 in an AMX service database 410.

The customer administrator 406 can be enabled to define an extension for a published extension point. An extension point can be a document or document portion that has been flagged by an application developer as eligible for extension. Extension points can enable selective control by application developers over what document portion(s) can be extended for use in the application. A registry service 412 portion of the AMX service 402 can collect extension points from different microservices (e.g., when new microservices are deployed) and store extension point information in a registry 414 of the AMX service database 410. The AMX service 402 can surface extension point information to the customer administrator 406 to enable the customer administrator 406 to select an extension point when defining a new extension field. The AMX service database 410 stores both AMX extension information 408 and, in the registry 414, information about all extendable microservices of the application. The information in the AMX service database 410, therefore, enables the AMX service 402 to orchestrate extension activation, as described below.

The AMX service 402 can sends requests (e.g., commands including extension instructions) to an AMX command topic 416. The AMX command topic 416 can be used for extension field activation, for example. For instance, the customer administrator 406 can select to activate a new extension field. In response to a request to activate a new extension field, the AMX service 402 can send an activation command to the AMX command topic 416. The activation command can instruct microservices to adapt to handle a new extension field.

Extendable microservices can read from the AMX command topic 416 by implementing an AMX handler component. For example, the requisition service 302 includes an AMX handler 418 and the PR2PO service 304 includes an AMX handler 420. Each AMX handler can use code from a common library associated with the AMX service 402, for example.

Each AMX handler 418 or 420 can listen for and retrieve an AMX command from the AMX command topic 416. Each AMX handler 418 or 420 can, for example, retrieve an AMX command to implement a new extension field. For example, each AMX handler 418 or 420 can retrieve information for the new extension field from the AMX command topic 416 and perform appropriate database schema enhancements for the respective requisition service 302 or PR2PO service 304, respectively. For instance, as illustrated by an arrow 422, the AMX handler 418 can enhance a tenant database schema in the requisition service database 306 to support the new extension field. Similarly, as illustrated by an arrow 424, the AMX handler 420 can enhance a tenant database schema in the PR2PO service database 308 to support the new extension field.

Each AMX handler 418 or 420 can send a status message to an AMX reply topic 426 indicating success or failure of the database schema enhancements to support the extension field, as respectively illustrated by arrows 428 and 430. The AMX service 402 can monitor the AMX reply topic 426 and collect responses from extendable microservices regarding activation status in respective microservices for a new extension field. The AMX service 402 can, using information in the registry 414, determine if a status response has been received at the AMX reply topic 426 in response to a sent AMX command from each relevant extendable microservice.

The AMX service 402 can determine whether all microservices have responded indicating successful activation. If all microservices have responded indicating successful activation, the AMX service can send an AMX command to the AMX command topic 416 informing the respective microservices that activation has completed. Accordingly, the extension field can be considered to be live and available at runtime for consumption during application use.

For instance, the requisition service 302 can send a message to the message topic 320 that includes PR information that includes value(s) for the new extension field (e.g., a new extension field value can be TRUE or FALSE for a new procure-for-vaccine extension field). The message received at the message topic 320 can include standard data for non-extension fields and a property bag. The property bag can be empty for customers who have not added custom field(s) for a document type but which can include property values for custom field(s) for those customers who have added custom field(s) for the document type.

Figure 5:
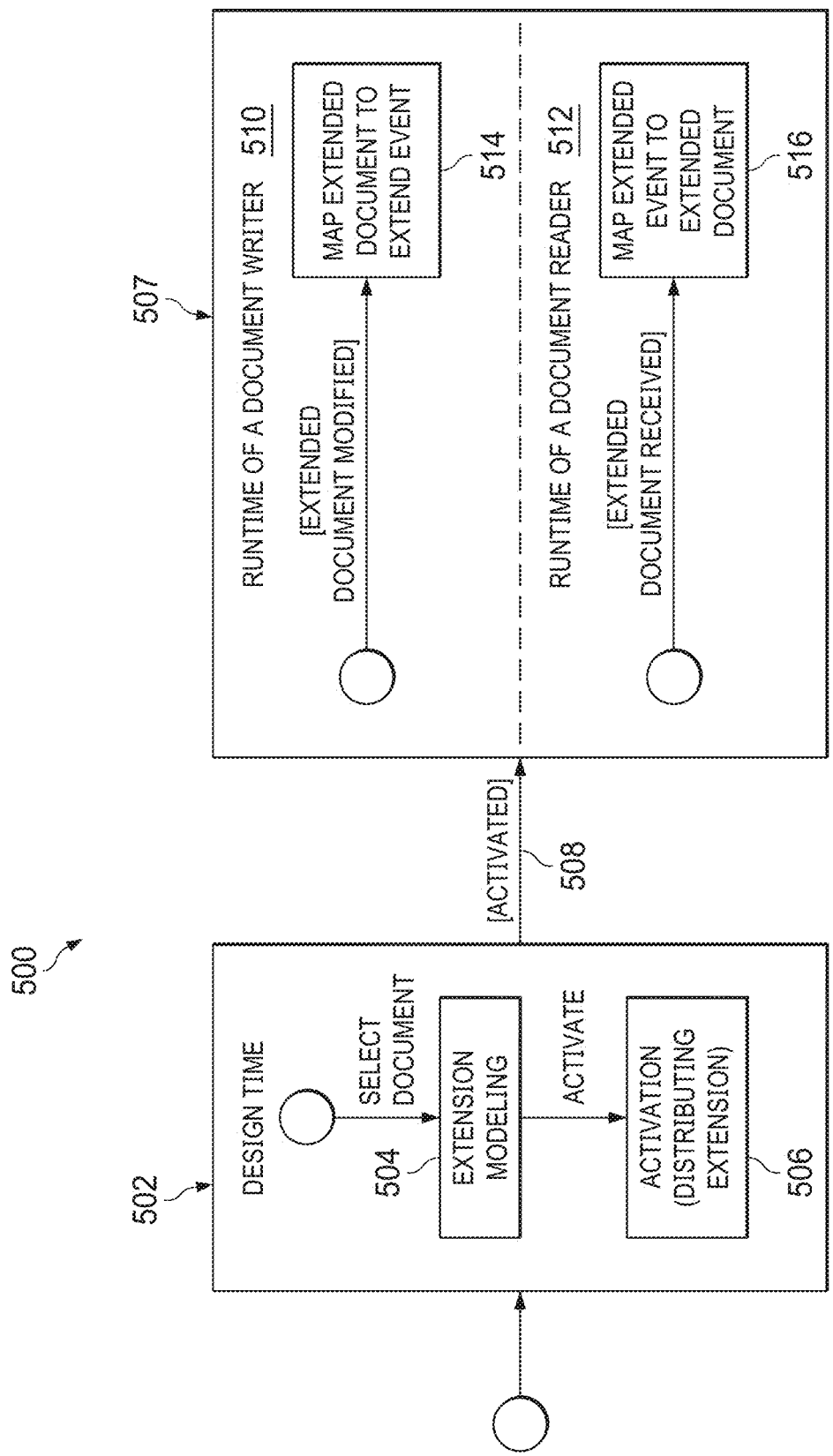
FIG. 5 is a state diagram that illustrates different states of an extension.

FIG. 5 is a state diagram 500 that illustrates different states of an extension. A lifecycle of an extension first starts in design time 502. Design time can be a part of a lifecycle of an extension where an administrative persona starts, in an extension modeling state 504, to model a new extension (e.g., a new extension field) for a selected document. For example, an administrator can define an extension field using a user interface by selecting a corresponding extension point and a field type and specifying a name of the extension field.

After performing modeling in the extension modeling state 504, the administrator can select to activate the extension, which can put the extension in an activation state 506 (e.g., which corresponds to distribution of the extension). In the activation state 506, the extension is distributed across the microservices of the application.

A microservice can be included in the AMX registry as part of design and development of the microservice. Registration can be performed so that AMX service can determine that the distribution and activation was indeed successful across all known relevant microservices. The AMX service can orchestrate and oversee the activation of the extension in each microservice. After verifying successful activation in each microservice, the extension is activated and available in a runtime environment 507. That is, upon successful activation, the extension is in an activated state 508. Extension states can continue as runtime states, for either a runtime 510 of a document writer or a runtime 512 of a document reader.

In the runtime 510 of the document writer, the extension is now available and the document writer can use the extension when creating, reading, or updating extended documents that include the extension. The document writer can also publish the extended document. For example, as shown in a state 514, the document writer can map the extended document to an extended event that is published to enable subscribers to receive the extended document.

For example, a published event can include the extension in a payload of the published event. A document reader can, in the runtime 512, receive the extended event. The document reader can be configured to interpret the extended event and to map the extended event to a local extended representation of the document, as shown in a state 516.

Figure 6:
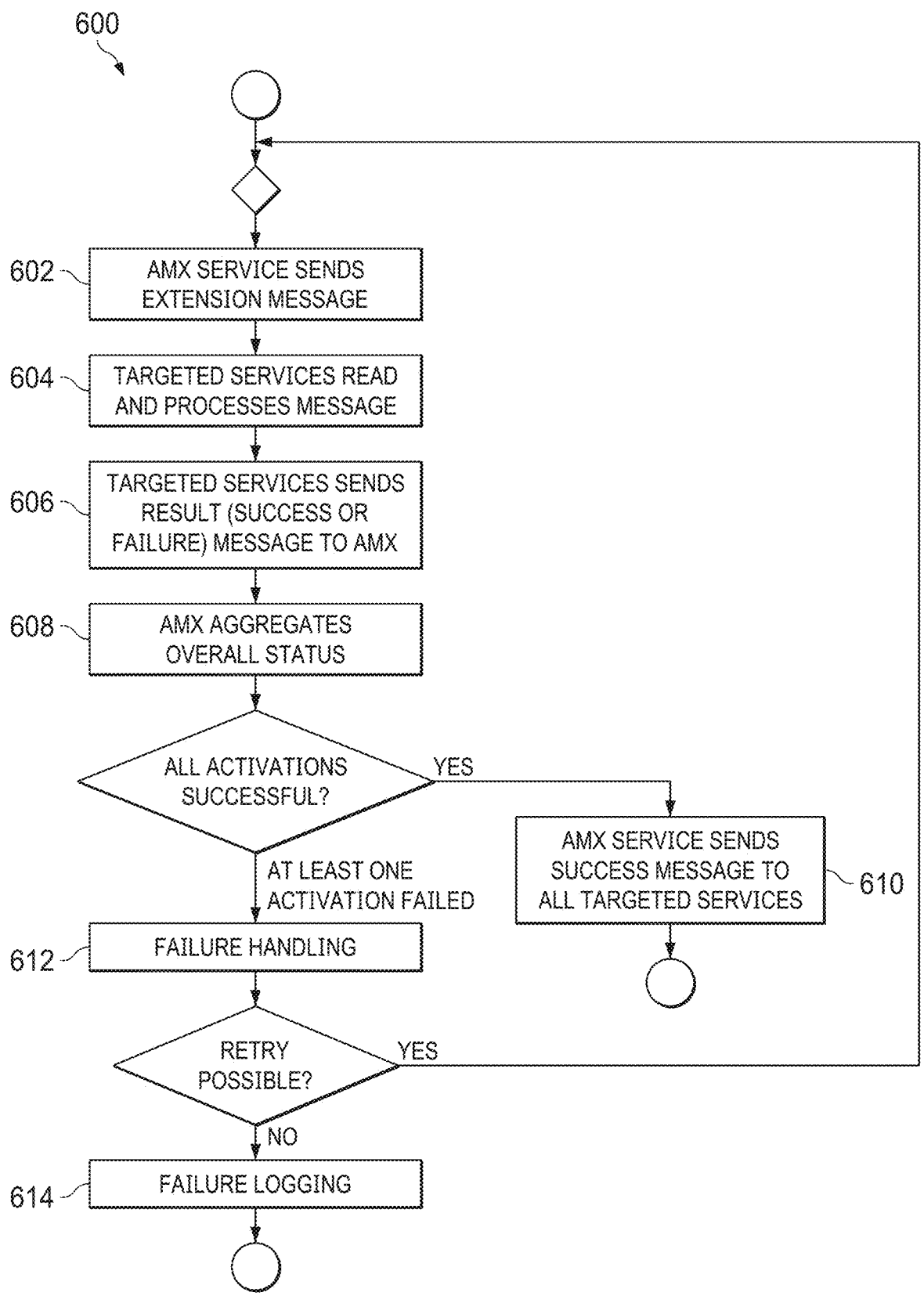
FIG. 6 is a flowchart of an example process for extension activation.

FIG. 6 is a flowchart of an example process 600 for extension activation. At 602, an AMX service sends an extension message. For example, the AMX service can generate an event that describes an extension field to be distributed. The event payload can include relevant data for extending data models. The event can be sent to a custom topic corresponding to extension activation.

At 604, targeted services read and process the extension message. For example, an AMX handler in each targeted microservice can read the event, persist the extension field, and enhance the structure of a document managed or used by the service.

At 606, the targeted services send a result message (e.g., success or failure) to the AMX service. For example, each AMX handler in each microservice can send a message to the AMX service indicating whether the extension message was successfully processed by the microservice.

At 608, the AMX service determines an overall status for the extension activation. For instance, the AMX service can determine the overall status based on a list of recipients as maintained in an AMX registry. If all activations by respective microservices are successful, the overall status can be success, otherwise the overall status can be failure.

At 610, if all activations by targeted services are successful, the AMX service can send a success message to each targeted service to communicate the overall activation status. The services are then able to consume the extension field.

At 612, if at least one service activation failed, the AMX service can perform failure handling. Failure handling can include determining whether an activation retry is possible. For example, failure may have occurred due to a temporary condition. If activation retry is possible, the process 600 can be repeated for the extension. At 614, if activation retry is not possible, failure logging is performed. In response to a logged failure, other failure handling can be performed (e.g., automatic or administrator-based handling). For example, a command can be sent to each microservice to rollback activation of the extension field.

Figure 7:
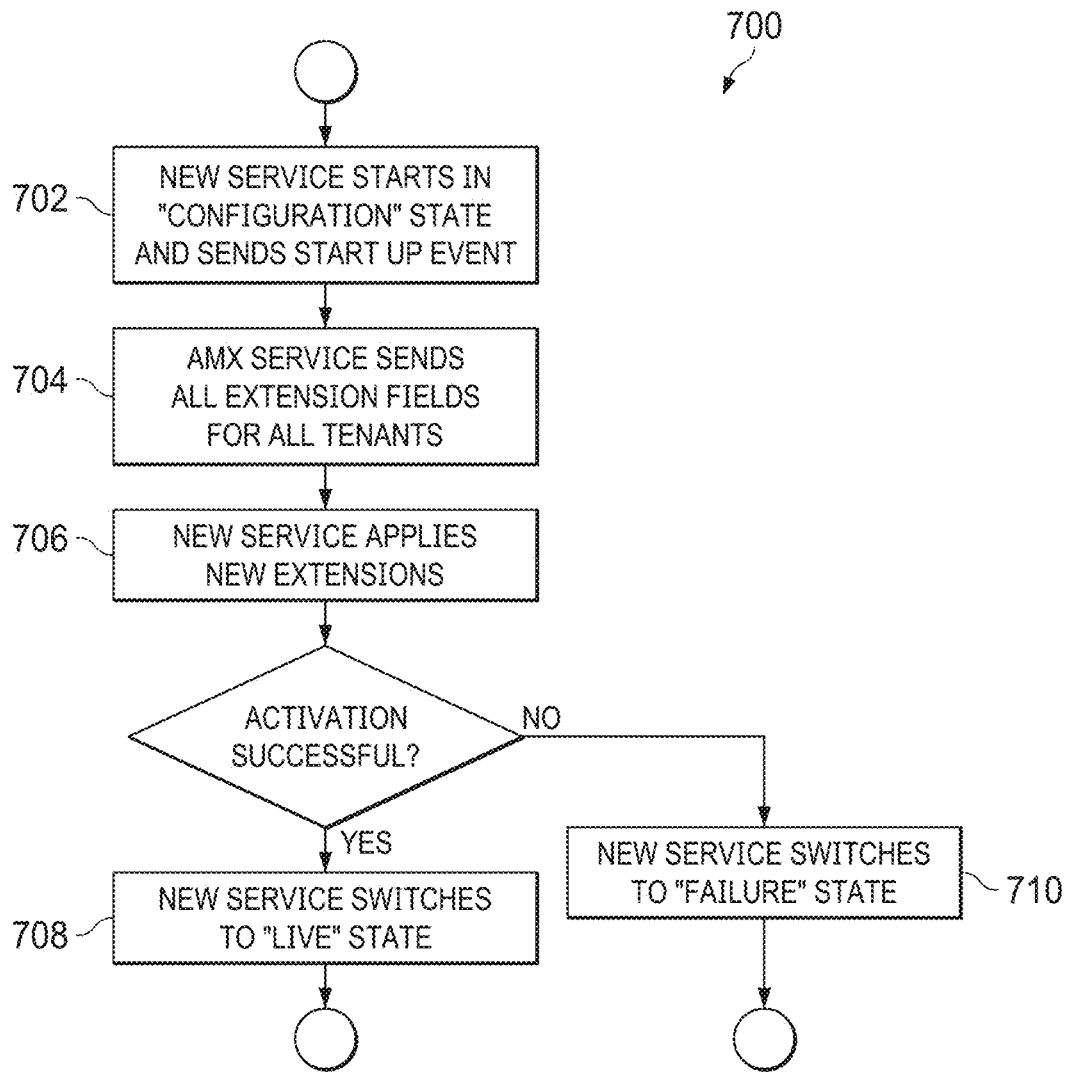
FIG. 7 is a flowchart of an example process for handling addition of a new microservice.

FIG. 7 is a flowchart of an example process 700 for handling addition of a new microservice. The process 700 can be performed as part of an initial load of a new microservice that did not participate in initial activation of one or more AMX extensions. A new microservice which is newly added to an application can be provided with an initial load of all existing, relevant extension fields which have been created for a specific document for which the microservice is responsible.

At 702, the new microservice starts in a configuration state. In the configuration state, the new microservice does not consume events or accept any requests, since the new microservice does not yet know if it has been configured with relevant extensions. In the configuration state, the new microservice sends a startup event message to the AMX service. A payload of the startup event message can include an extension point and data type for a document type for which the new microservice is responsible.

In response to the startup event message received from the new microservice, the AMX service can collect all the activated extension fields relevant to the extension point for all tenants. At 704, the AMX service sends information for collected extension fields to the new microservice, in response to the startup event message.

At 706, the new microservice applies the received extensions. For example, the new microservice can persist extension fields at the new microservice and enhance the structure of the document for which the microservice is responsible, if appropriate.

At 708, if the new microservice successfully activates, at the new microservice, the appropriate extensions, the new microservice switches to a live state and can consume events and requests.

At 710, if the new microservice does not successfully activate the appropriate extensions, the new microservice can switch to a failure state, which can result in different types of failure handling being performed (e.g., manual and/or automated interventions).

FIG. 8 illustrates an example application model extension event model 800. Line 1 of the event model 800 includes an identifier of a set of extensions and line 2 indicates an aggregate status (e.g., "activated") of extensions in the set of extensions. The event model 800 describes an event that broadcasts information indicating that the AMX service activated new extension fields for an extension point "PurchaseRequisitionItem". A receiving service can react to the event if the extension point is relevant to the service.

Line 3 of the event model 800 denotes a start of a collection of extensions included in the set of extensions. Lines 5, 6, and 7 define an extension with a name of "Procure for Vaccine", with a type of BOOLEAN, and an extension point of "PurchaseRequisitionItem", respectively. The event model 800 can hold information for extensions that are defined at design time, for example. FIGS. 9, 10, and 11 illustrate runtime data items.

FIG. 9 illustrates an example extended database schema 900 for a microservice for a tenant. Lines 1, 2, and 3 of the extended database schema 900 specify quantity, unit of measure, and currency fields previously included in the schema before addition of an extension field for a procure-for-vaccine flag. Line 4 (e.g., an ellipses) of the schema indicates that the extended database schema can also include other fields before addition of the extension field. Line 5 of the extended database schema 900 specifies that the procure-for-vaccine flag is now, as an extension field, a part of the extended database schema 900 for the microservice for the tenant. The illustrated schema is shown in a JSON (JavaScript Object Notation) format. Other formats can be used. The addition of the procure-for-vaccine flag field to the extended database schema 900 by the microservice can result in an addition of a column for the tenant for the procure-for-vaccine flag in a database used by the microservice.

FIG. 10 illustrates an example message schema 1000 that can support extension field values. The message schema 1000 can support messages handled by a microservice that either have respective value(s) for one or more extension fields, or which don't have any values for extension fields. For instance, the microservice may handle a first message for a first tenant which has not added the procure-for-vaccine flag as an extension field and a second message for a second tenant which has added the procure-for-vaccine flag as an extension field. Lines 1, 2, 3, 4, and 5 of the message schema 1000 define baseline message fields that may exist in any message handled by the microservice.

Line 6 of the message schema 1000 defines a "properties bag" field which may hold values of one or more extension fields, if relevant for a given tenant. The properties bag is implemented as an array of zero or more key-value pairs. For a given message instance of the message schema 1000 handled by the microservice for a tenant for which no extension fields have been added, the property bag can be empty. For a given message instance of the message schema 1000 handled by the microservice for a tenant for which at least one extension field has been added, the property bag can include a key-value pair for each extension field, with a given key identifying an extension field and the accompanying value of the key-value pair holding the value for the extension field for the message instance. The message schema 1000 is thus semi-structured, with a predefined structured portion defined by lines 1, 2, 3, 4, and 5, and a flexible portion defined by line 6.

FIG. 11 illustrates an example message instance 1100 for a microservice that includes an extension field value. The message instance 1100 can be an instance of the message schema 1000 described above with respect to FIG. 10. Lines 1, 2, 3, and 5 of the message instance 1100 include values for baseline quantity, unit of measure, currency, and item category baseline message fields, respectively. Line 6 of the message instance 1100 defines a properties bag that includes a key-value pair for the procure-for-vaccine flag extension field (e.g., with a value of TRUE for the field). If the message instance 1100 was actually for a tenant for which multiple extension fields had been defined for the microservice, the properties bag can include multiple key-value pairs (e.g., in a comma-separated list of key-value pairs).

FIG. 12 illustrates an example extension field list user interface 1200. The extension field list user interface 1200 can be used to manage extension fields by viewing, searching, and filtering a list of extension fields. For example, an extension field list 1202 includes a list of extension fields in the system. The extension field list 1202 includes, for each extension field, an extension point 1204, an extension field name 1206, a status 1208 (e.g., ACTIVATED, NOT_ACTIVATED, ACTIVATION_FAILED), and a data type 1210 of the extension field. A filter area 1212 enables a user to filter the extension field list 1202 by editing status 1214 (e.g., draft, unchanged), extension point 1216, extension field name 1218, status 1220, or data type 1222. A user can use a search control 1224 to search for extension fields whose name or properties match an entered search string. The user can view details about a particular extension field by selecting an extension field in the extension field list 1202 (and/or by double-clicking the extension or hitting an enter key when the extension field is selected, for example).

FIG. 13 illustrates an example extension field detail user interface 1300. The user interface 1300 can be displayed in response to a user selecting an extension field from the user interface 1200, for example. As another example, the user interface 1300 can be used to enter information for and to trigger creation of a new extension field. The user interface 1300 displays information for an extension field with a name 1302 of "Approval Amount". A status 1304 of "not activated" is displayed. The extension field can be a new extension field, for example. An extension point 1306 of the extension field is shown, along with a data type 1308 and further data type details 1310 and 1312. The user can trigger activation of the extension field by selecting a "create" button 1314. The information for the extension field can be deleted in response to user selection of a discard-draft link 1316.

Figure 14:
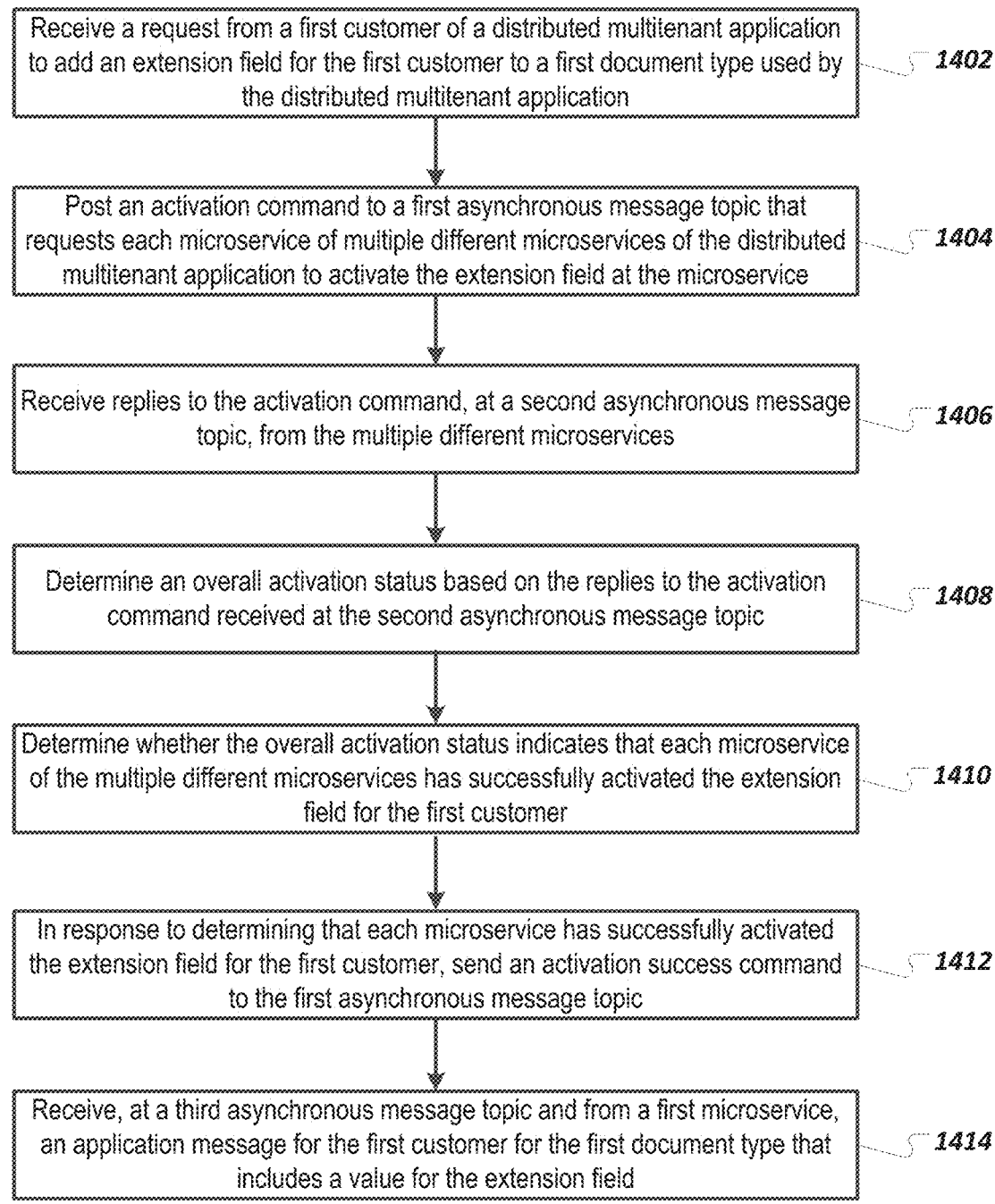
FIG. 14 is a flowchart of an example method for tenant-specific extensions in distributed applications using an application model extension engine.

FIG. 14 is a flowchart of an example method for tenant-specific extensions in distributed applications using an application model extension engine. It will be understood that method 1400 and related methods may be performed, for example, by any suitable system, environment, software, and hardware, or a combination of systems, environments, software, and hardware, as appropriate. For example, one or more of a client, a server, or other computing device can be used to execute method 1400 and related methods and obtain any data from the memory of a client, the server, or the other computing device. In some implementations, the method 1400 and related methods are executed by one or more components of the system 100 described above with respect to FIG. 1. For example, the method 1400 and related methods can be executed by the server 102 of FIG. 1.

At 1402, a request is received from a first customer of a distributed multitenant application to add an extension field for the first customer to a first document type used by the distributed multitenant application.

At 1404, an activation command is posted to a first asynchronous message topic that requests each microservice of multiple different microservices of the distributed multitenant application to activate the extension field at the microservice by enhancing, in a microservice database of the microservice, a database schema for first customer for the first document type to support the extension field for the first customer.

At 1406, replies to the activation command are received, at a second asynchronous message topic, from the multiple different microservices, where each reply indicates whether a respective microservice of the multiple different microservices has successfully activated the extension field at the microservice for the first customer.

At 1408, an overall activation status is determined based on the replies to the activation command received at the second asynchronous message topic.

At 1410, a determination is made as to whether the overall activation status indicates that each microservice of the multiple different microservices has successfully activated the extension field for the first customer.

At 1412, in response to determining that each microservice of the multiple different microservices has successfully activated the extension field for the first customer, an activation success command is sent to the first asynchronous message topic that informs the multiple different microservices that the extension field can be used for the first customer in the distributed multitenant application.

At 1414, an application message for the first customer for the first document type that includes a value for the extension field is received at a third asynchronous message topic and from a first microservice.

Although extension fields are described other types of extensions can be supported by the AMX service. For example, the AMX service can communicate and coordinate change across microservices to entity relationships, new document types, new sub-objects or document sections. Additionally, the AMX service can be involved in coordinating custom logic that may be applied to extension fields along with communicating and managing addition of extension fields.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
    receiving a request from a first customer of a distributed multitenant application to add an extension field for the first customer to a first document type used by the distributed multitenant application;
    posting an activation command to a first asynchronous message topic that requests each microservice of multiple different microservices of the distributed multitenant application to activate the extension field at the microservice by enhancing, in a microservice database of the microservice, a database schema for first customer for the first document type to support the extension field for the first customer;
    receiving replies to the activation command, at a second asynchronous message topic, from the multiple different microservices, wherein each reply indicates whether a respective microservice of the multiple different microservices has successfully activated the extension field at the microservice for the first customer;
    determining an overall activation status based on the replies to the activation command received at the second asynchronous message topic;
    determining whether the overall activation status indicates that each microservice of the multiple different microservices has successfully activated the extension field for the first customer;
    in response to determining that each microservice of the multiple different microservices has successfully activated the extension field for the first customer, sending an activation success command to the first asynchronous message topic that informs the multiple different microservices that the extension field can be used for the first customer in the distributed multitenant application; and
    receiving, at a third asynchronous message topic and from a first microservice, an application message for the first customer for the first document type that includes a value for the extension field.

2. The computer-implemented method of claim 1, further comprising:
    retrieving the application message, by a second microservice;
    extracting, by the second microservice, information from the application message, wherein the information includes the value for the extension field; and
    storing, by the second microservice, the value for the extension field in a portion of a microservice database of the second microservice that stores data for the first customer.

3. The computer-implemented method of claim 1, further comprising:
    receiving, from a third microservice, a startup event that indicates that the third microservice is a new microservice;
    identifying a set of extensions that have not been activated at the third microservice, wherein the set of extensions includes the extension field;
    sending, for each extension in the set of extensions, an activation command to the third microservice to activate the extension;
    receiving a status reply to each activation command that indicates whether the third microservice has successfully activated a respective extension; and
    storing an activation state of the third microservice that indicates whether the third microservice has successfully activated each extension.

4. The computer-implemented method of claim 1, further comprising:
    before receiving the request from the first customer to add the extension field, identifying extension points of document types used in the distributed multitenant application, wherein each extension point indicates a document portion of a document type that can be extended; and providing the identified extension points to the first customer in a user interface that enables the first customer to provide information for the extension field and associate the extension field with a first extension point at which to add the extension field;

wherein the request received from the first customer comprises the first extension point.

5. The computer-implemented method of claim 1, further comprising, in response to determining that not all microservices of the multiple different microservices have successfully activated the extension field for the first customer, determining whether to resubmit the activation command to microservices that have not successfully activated the extension field.

6. The computer-implemented method of claim 5, further comprising, in response to determining to resubmit the activation command, resubmitting the activation command to microservices that have not successfully activated the extension field.

7. The computer-implemented method of claim 5, further comprising, in response to determining to not resubmit the activation command, performing error handling based on not all microservices having successfully activated the extension field.

8. The computer-implemented method of claim 7, wherein the error handling comprises sending a rollback command instructing microservices that activated the extension field to rollback activation of the extension field.

9. The computer-implemented method of claim 1, further comprising receiving, at the third asynchronous message topic and from a first microservice, an application message for a second customer for the first document type that does not include a value for the extension field.

10. The computer-implemented method of claim 9, wherein the application message for the first customer and the application message for the second customer each include a property bag, wherein the property bag in the application message for the first customer includes the value for the extension field and the property bag in the application message for the second customer is an empty property bag.

11. A system comprising:
one or more hardware processors; and
a computer-readable medium coupled to the one or more hardware processors having instructions stored thereon which, when executed by the one or more hardware processors, cause the one or more hardware processors to perform operations comprising:
receiving a request from a first customer of a distributed multitenant application to add an extension field for the first customer to a first document type used by the distributed multitenant application;
posting an activation command to a first asynchronous message topic that requests each microservice of multiple different microservices of the distributed multitenant application to activate the extension field at the microservice by enhancing, in a microservice database of the microservice, a database schema for first customer for the first document type to support the extension field for the first customer;
receiving replies to the activation command, at a second asynchronous message topic, from the multiple different microservices, wherein each reply indicates whether a respective microservice of the multiple different microservices has successfully activated the extension field at the microservice for the first customer;
determining an overall activation status based on the replies to the activation command received at the second asynchronous message topic;
determining whether the overall activation status indicates that each microservice of the multiple different microservices has successfully activated the extension field for the first customer;
in response to determining that each microservice of the multiple different microservices has successfully activated the extension field for the first customer, sending an activation success command to the first asynchronous message topic that informs the multiple different microservices that the extension field can be used for the first customer in the distributed multitenant application; and
receiving, at a third asynchronous message topic and from a first microservice, an application message for the first customer for the first document type that includes a value for the extension field.

12. The system of claim 11, wherein the operations further comprise:
retrieving the application message, by a second microservice;
extracting, by the second microservice, information from the application message, wherein the information includes the value for the extension field; and
storing, by the second microservice, the value for the extension field in a portion of a microservice database of the second microservice that stores data for the first customer.

13. The system of claim 11, wherein the operations further comprise:
receiving, from a third microservice, a startup event that indicates that the third microservice is a new microservice;
identifying a set of extensions that have not been activated at the third microservice, wherein the set of extensions includes the extension field;
sending, for each extension in the set of extensions, an activation command to the third microservice to activate the extension;
receiving a status reply to each activation command that indicates whether the third microservice has successfully activated a respective extension; and
storing an activation state of the third microservice that indicates whether the third microservice has successfully activated each extension.

14. The system of claim 11, wherein the operations further comprise:
before receiving the request from the first customer to add the extension field, identifying extension points of document types used in the distributed multitenant application, wherein each extension point indicates a document portion of a document type that can be extended; and
providing the identified extension points to the first customer in a user interface that enables the first customer to provide information for the extension field and associate the extension field with a first extension point at which to add the extension field;
wherein the request received from the first customer comprises the first extension point.

15. The system of claim 11, wherein the operations further comprise, in response to determining that not all microservices of the multiple different microservices have successfully activated the extension field for the first customer, determining whether to resubmit the activation command to microservices that have not successfully activated the extension field.

16. A computer program product encoded on a non-transitory storage medium, the product comprising non-transitory, computer readable instructions for causing one or more processors to perform operations comprising:

receiving a request from a first customer of a distributed multitenant application to add an extension field for the first customer to a first document type used by the distributed multitenant application;

posting an activation command to a first asynchronous message topic that requests each microservice of multiple different microservices of the distributed multitenant application to activate the extension field at the microservice by enhancing, in a microservice database of the microservice, a database schema for first customer for the first document type to support the extension field for the first customer;

receiving replies to the activation command, at a second asynchronous message topic, from the multiple different microservices, wherein each reply indicates whether a respective microservice of the multiple different microservices has successfully activated the extension field at the microservice for the first customer;

determining an overall activation status based on the replies to the activation command received at the second asynchronous message topic;

determining whether the overall activation status indicates that each microservice of the multiple different microservices has successfully activated the extension field for the first customer;

in response to determining that each microservice of the multiple different microservices has successfully activated the extension field for the first customer, sending an activation success command to the first asynchronous message topic that informs the multiple different microservices that the extension field can be used for the first customer in the distributed multitenant application; and receiving, at a third asynchronous message topic and from a first microservice, an application message for the first customer for the first document type that includes a value for the extension field.

17. The computer program product of claim 16, wherein the operations further comprise:

retrieving the application message, by a second microservice;

extracting, by the second microservice, information from the application message, wherein the information includes the value for the extension field; and storing, by the second microservice, the value for the extension field in a portion of a microservice database of the second microservice that stores data for the first customer.

18. The computer program product of claim 16, wherein the operations further comprise:

receiving, from a third microservice, a startup event that indicates that the third microservice is a new microservice;

identifying a set of extensions that have not been activated at the third microservice, wherein the set of extensions includes the extension field;

sending, for each extension in the set of extensions, an activation command to the third microservice to activate the extension;

receiving a status reply to each activation command that indicates whether the third microservice has successfully activated a respective extension; and storing an activation state of the third microservice that indicates whether the third microservice has successfully activated each extension.

19. The computer program product of claim 16, wherein the operations further comprise:

before receiving the request from the first customer to add the extension field, identifying extension points of document types used in the distributed multitenant application, wherein each extension point indicates a document portion of a document type that can be extended; and providing the identified extension points to the first customer in a user interface that enables the first customer to provide information for the extension field and associate the extension field with a first extension point at which to add the extension field;

wherein the request received from the first customer comprises the first extension point.

20. The computer program product of claim 16, wherein the operations further comprise, in response to determining that not all microservices of the multiple different microservices have successfully activated the extension field for the first customer, determining whether to resubmit the activation command to microservices that have not successfully activated the extension field.

* * * * *